(12) United States Patent
Lewis et al.

(10) Patent No.: US 8,631,176 B2
(45) Date of Patent: Jan. 14, 2014

(54) ASYNCHRONOUS COMMUNICATIONS TECHNIQUE

(75) Inventors: Jody Western Lewis, Farmington, UT (US); Kerry Lynn Riggs, Salt Lake, UT (US)

(73) Assignee: GVBB Holdings S.A.R.L., Luxembourg (LU)

( * ) Notice: Subject to any disclaimer, the term of this patent is extended or adjusted under 35 U.S.C. 154(b) by 1519 days.

(21) Appl. No.: 10/544,749

(22) PCT Filed: Feb. 9, 2004

(86) PCT No.: PCT/US2004/003701
§ 371 (c)(1),
(2), (4) Date: Aug. 8, 2005

(87) PCT Pub. No.: WO2004/072852
PCT Pub. Date: Aug. 26, 2004

(65) Prior Publication Data
US 2006/0090019 A1  Apr. 27, 2006

Related U.S. Application Data

(60) Provisional application No. 60/446,524, filed on Feb. 11, 2003, provisional application No. 60/454,734, filed on Mar. 14, 2003.

(51) Int. Cl.
*G06F 13/38* (2006.01)
*G06F 9/46* (2006.01)

(52) U.S. Cl.
USPC .................................... 710/69; 718/103

(58) Field of Classification Search
USPC .......................................... 710/44; 718/103
See application file for complete search history.

(56) References Cited

U.S. PATENT DOCUMENTS

| | | | |
|---|---|---|---|
| 4,800,521 A * | 1/1989 | Carter et al. | 718/102 |
| 5,247,671 A * | 9/1993 | Adkins et al. | 718/103 |
| 5,590,288 A | 12/1996 | Castor et al. | |
| 6,230,118 B1 | 5/2001 | Bader et al. | |
| 6,275,864 B1 | 8/2001 | Mancusi et al. | |
| 6,353,857 B2 | 3/2002 | Bader et al. | |
| 6,360,281 B1 * | 3/2002 | Feagans | 710/1 |

(Continued)

FOREIGN PATENT DOCUMENTS

| CN | 1316698 | 3/2003 |
|---|---|---|
| JP | 11259410 | 9/1999 |

(Continued)

OTHER PUBLICATIONS

Search Report Dated Jul. 9, 2004.

(Continued)

*Primary Examiner* — Henry Tsai
*Assistant Examiner* — Juanito Borromeo
(74) *Attorney, Agent, or Firm* — Arent Fox LLP

(57) ABSTRACT

A main processor manages serial communication with one or more external devices by establishing the requisite tasks needed for serial communications. For example, these tasks can include (1) serial device handling, (2) protocol encapsulation, and (3) low-level communication with external devices. A priority is assigned to each of the tasks so that timing requirements are met, while maximizing processor efficiency of the main processor. Upon its completion, each lower priority task initiates execution of a next higher priority task to synchronize data processing with data communication.

20 Claims, 2 Drawing Sheets

(56) References Cited

U.S. PATENT DOCUMENTS

| | | |
|---|---|---|
| 6,438,146 B1 | 8/2002 | Brafford |
| 6,577,635 B2 | 6/2003 | Narayana et al. |
| 2003/0133479 A1 | 7/2003 | Morikawa et al. |
| 2004/0054998 A1 | 3/2004 | Hayashi |

FOREIGN PATENT DOCUMENTS

| | | |
|---|---|---|
| JP | 2001117785 | 4/2001 |
| JP | 2001519060 | 10/2001 |
| JP | 2002507302 | 3/2002 |

OTHER PUBLICATIONS

Office Action for Korean Application No. 2005-7014750, dated Feb. 23, 2011, including an English language translation.
Office Action issued for Chinese Patent Application No. 200480003891.0, dated Jun. 6, 2007.
Office Action issued for Japanese Patent Application No. 2006503420, dated Aug. 17, 2009.
Written Opinion of the Internal Searching Authority, PCT Application No. PCT/US04/03701, mailed Feb. 9, 2004.
Notification Concerning Transmittal of International Preliminary Report on Patentability of the International Bureau of WIPO of Geneva, Switzerland, mailed Feb. 9, 2004.

* cited by examiner

ASYNCHRONOUS COMMUNICATIONS TECHNIQUE

CROSS-REFERENCE TO RELATED APPLICATIONS

This application claims the benefit, under 35 U.S.C. 365 of International Application PCT/US04/03701, filed Feb. 9, 2004, which was published in accordance with PCT Article 21(2) on Aug. 26, 2004 in English and which claims the benefit of U.S. provisional patent application No. 60/446,524, filed Feb. 11, 2003 and U.S. provisional patent application No. 60/454,734, filed Mar. 14, 2003.

This invention relates to a technique for achieving asynchronous serial communication between devices.

BACKGROUND ART

Embedded systems often employ some form of asynchronous serial communication with other devices. Usually a coprocessor will manage the intricate details of the serial protocol(s) used for communication. In the absence of a coprocessor, the task of servicing serial devices will fall on the main processor, thus consuming valuable resources and imposing burdensome priority and timing requirements. Most serial protocols typically have stringent timing requirements. Without a coprocessor, the main processor handling the serial communication task will need a detailed knowledge of the system hardware to exploit the processor's capabilities. Knowledge of the system hardware entails knowing about low-level device driver routines, which are often prone to errors. In that regard, the main processor must verify a serial device's compliance as well as ensuring its own compliance. Taking a generic approach with regard to processor priorities can waste processor resources. Setting task priorities too low can cause missed deadlines due to task pre-emption resulting from other tasks running at higher priorities Setting task priorities too high can block critical tasks and waste processor time.

Thus, there is need for a technique for achieving asynchronous serial communication in the absence of a co-processor, which overcomes the aforementioned disadvantages.

BRIEF SUMMARY OF THE INVENTION

Briefly, in accordance with a preferred embodiment of the present principles, there is provided a method for managing serial communication by a main processor. The method commences by establishing the requisite tasks needed for serial communications. For example, these tasks can include (1) serial device handling, (2) protocol encapsulation, and (3) low-level communication with external devices. A priority is assigned to each of the tasks so that timing requirements are met, while maximizing processor efficiency of the main processor. Upon its completion, each lower priority task initiates execution of a next higher priority task to synchronize data processing with data communication.

BRIEF SUMMARY OF THE DRAWINGS

FIG. 1 depicts a schematic diagram depicting each of a set of logical blocks (objects) associated with different tasks related to serial communication; and FIG. 2 depicts a timing diagram that depicts the sequence of events performed by the tasks of FIG. 1.

DETAILED DESCRIPTION

FIG. 1 shows a block diagram of a system 10 in accordance with the present principles for efficiently managing serial communications with one or more peripheral devices (not shown) without the need for a dedicated co-processor. The system 10 comprises a main processor 11 having a first block 12 that takes the form of a set of instructions and associated data files. The first block 12, herein after referred to as "DeviceManager" performs a first set of operations in connection with serial communications, including the polling of an address space that includes serial device(s) (not shown) with which the processor 10 seeks to communicate through a serial port 13. When present, each serial device connected to the main processor 11 through the serial port 13 will respond, thereby allowing the DeviceManager 12 to request data from such devices required for communications purposes. For the identified serial device(s), the DeviceManager block 12 creates a task, depicted in FIG. 1 as DeviceManagerTask 14 that initiates polling of the identified device(s) for data updating purposes. The DeviceManagerTask 14 runs at a lower priority, at least as compared to other system tasks. As discussed hereinafter, a task (e.g., DeviceManagerTask 14) is defined as the performance of an action, whereas, an object (e.g., DeviceManager 12) provides functions and/or data for use by a task.

Within the processor 11, a second block 15, hereinafter referred to as the SerialProtocol block, encapsulates the details of the serial protocol(s) employed to communicate with external device(s) through the serial port 13. An example of such a serial protocol is the esTributary protocol, although others exist and could easily be used. The SerialProtocol block 15 provides functions used to format outbound messages according to the protocol specification and ensure outbound messages comply with protocol's timing requirements. The SerialProtocol block 15 also contains functions to verify inbound messages' compliance with the protocol specifications and the protocol timing requirements. The SerialProtocol block 15 creates a task 16, hereinafter, referred to as the SerialProtocolTask, which controls the writing of data to, and the reading of data from the external device(s) through the serial port 13 according to this particular protocol's requirements. The SerialProtocolTask 15 runs at a sufficiently high priority to ensure that the task meets assigned timing deadlines.

The main processor 11 of FIG. 1 also includes a third block 17, referred to as a SerialPort block that encapsulates low-level communication with the serial port 13. The SerialPort block 17 serves to create an abstract (i.e., a model) of the serial port 13 making the architecture of this block more portable and reusable. The SerialPort block 17 provides functions to read data from and write data to the serial port 13 and also has responsibility to implement timeouts on read operations. The SerialPort block 17 creates a task 18, hereinafter referred to as SerialReadTask that reads all serial data sent to the processor 11 through the serial port 13. For that reason, the Serial ReadTask must run at a priority high enough to ensure that the task meets timing deadlines as required by any protocol using the serial port.

FIG. 2 depicts a timing diagram that illustrates the sequence of events associated with initiating serial communication illustrating the advantage of the serial communication technique of the present principles. The process of serial communication commences when the DeviceManagerTask 14 of FIG. 1 initiates polling of an address corresponding to the serial port 13 of FIG. 1 by calling the Poll 90 function of DeviceManager 12. Poll 90 in turn calls the Poll 100 function of SerialProtocol 15. Poll 100 in turn calls the SetData 110 function which copies the destination address to SerialProtocol block 15 and then calls the semGive 120 function of SerialPort 17.

At initialization or subsequent to some previous poll event SerialProtocolTask 16 blocked (stopped running) in semTake 130 waiting for its semaphore. The semGive 120 functions triggers SerialProtocolTask 16 that it has valid data and may now run. This results in the Write 140 function being called which writes the polling data to serial port 13 of FIG. 1. Subsequently the Read 150 function is called. Read 150 in turn calls the semTake 160 function which causes SerialProtocolTask 16 to block (stop running) until it is triggered in 170.

Figure 1:
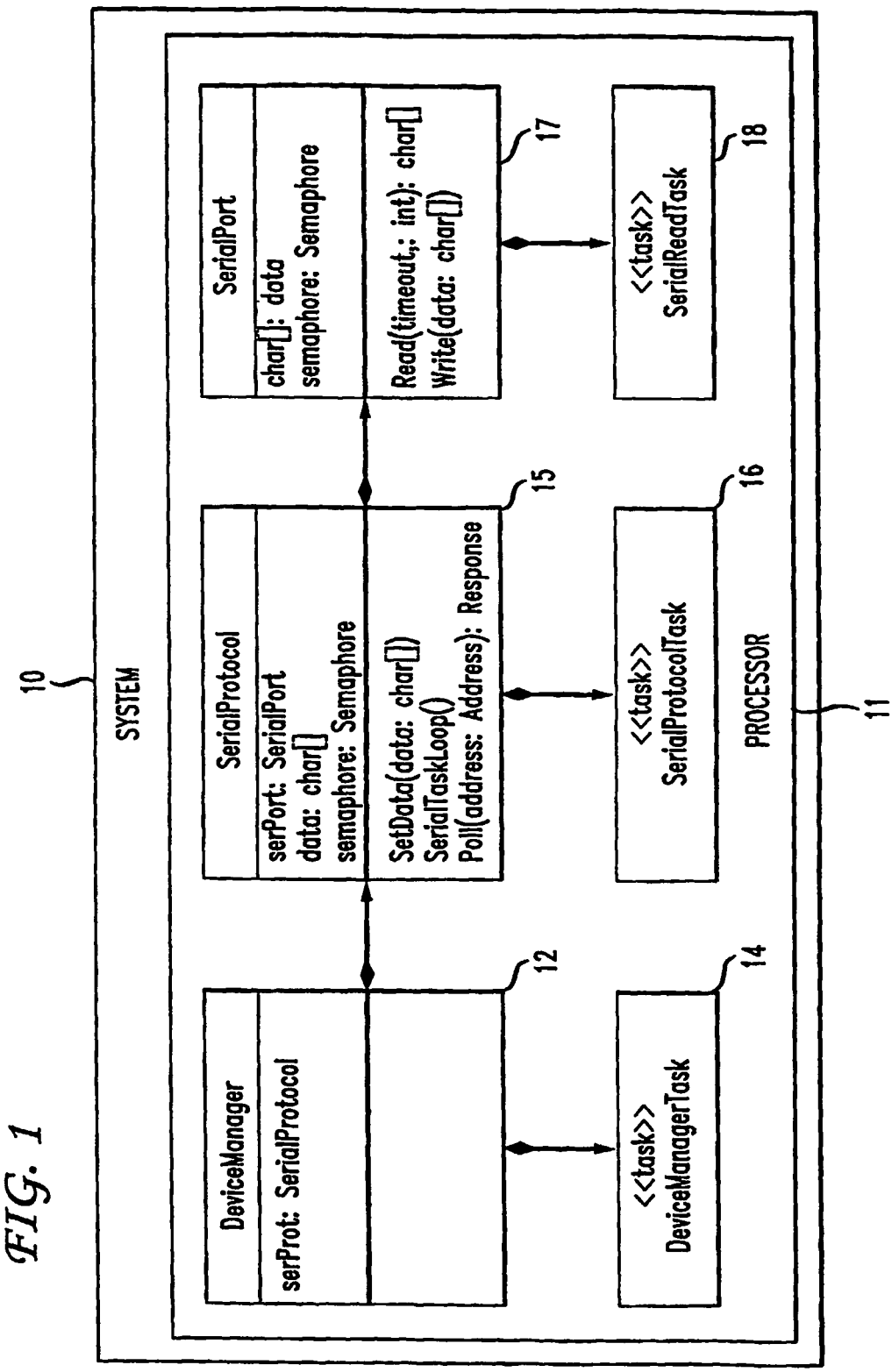
Figure 2:
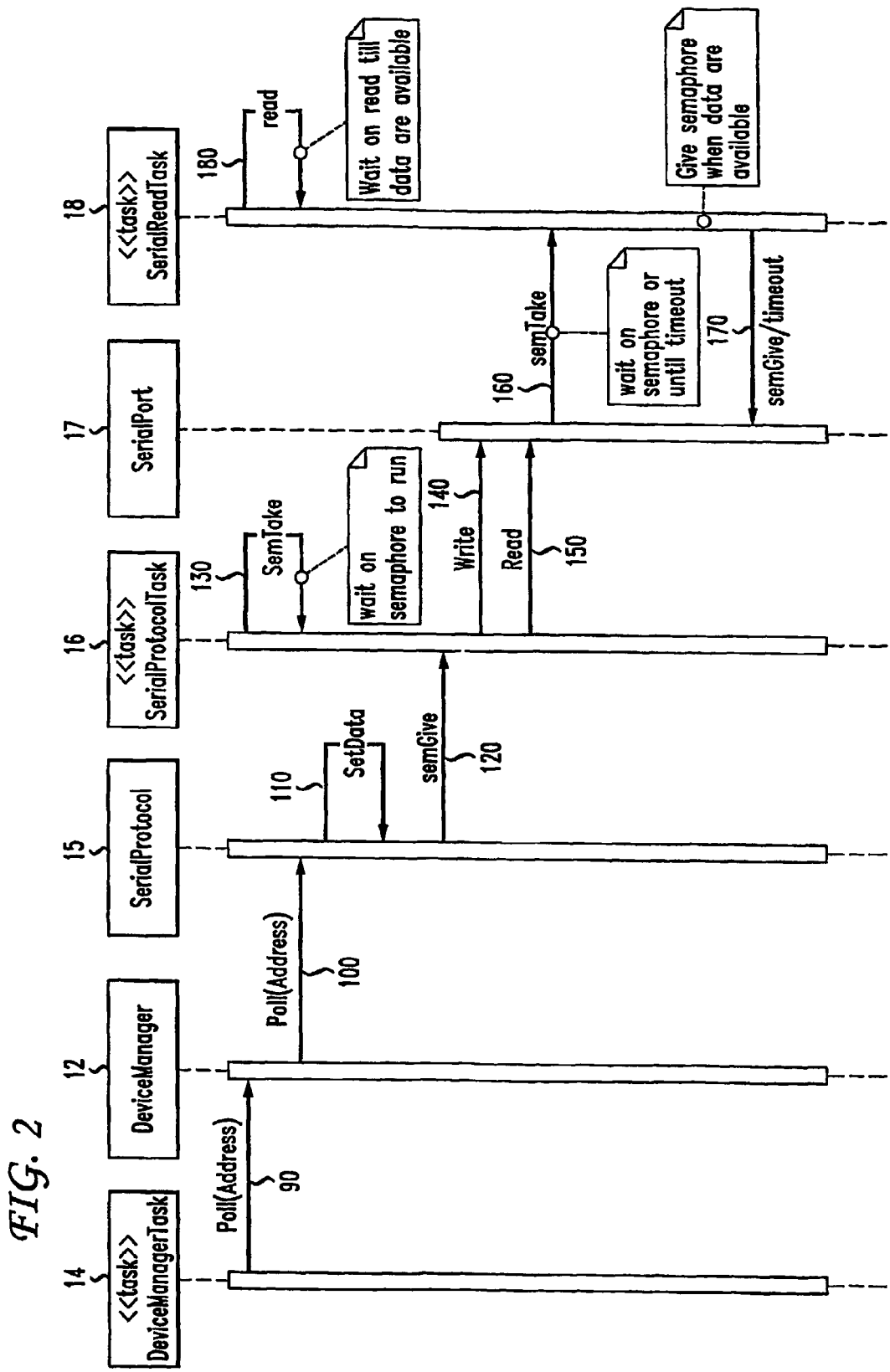

SerialReadTask 18 continually looks for incoming data from serial port 13 of FIG. 1 in its read 180 function. When any data are available they are copied into SerialPort block 17. The semTake 160 function returns in 170 when the data requested in Read 150 is available or the specified time has elapsed. This triggers SerialProtocolTask 16 to run which returns the poll data (if the read was successful) or an error indication (if the time limit was exceeded) to DeviceManagerTask 14.

Since SerialReadTask 18 runs at a high system priority it can be guaranteed to meet its timing deadlines, but since it only runs when data are available from serial port 13 of FIG. 1 it will never consume system resources unnecessarily.

Similarly, since SerialProtocolTask 16 runs at a high system priority it too can be guaranteed to meet its timing deadlines. It is only triggered to run when a poll function is required so it will not consume system resources unnecessarily when it is not needed. When it is active and waiting for a response from a serial device it also blocks (stops and waits) on the SerialPort block 17 to trigger it to run again, thus not consuming unnecessary system resources during this phase of the communication cycle. Polling is one method for communicating with a group of serial devices. Another option would be to have the serial port interrupt the processor when data is available. If there were only one serial device attached the processor could communicate to it without any polling or addressing. The present technique is applicable to all these mechanisms. The entire serial communication cycle is gated by the low priority DeviceManagerTask 14. This allows the system to meet timing requirements of the serial protocol during a serial communication cycle. But these serial communication cycles are only allowed to run when other, higher-priority tasks in the system allow the DeviceManagerTask 14 to run.

The foregoing describes a technique for achieving serial communication without the need for dedicated co-processor for managing communications tasks.

The invention claimed is:

1. A method for facilitating asynchronous serial communication by a main processor with at least one external communications device, comprising the steps of:
established at the main processor a set of blocks of instructions each including at least one instruction for execution by the main processor for accomplishing serial communication, where the set of blocks of instructions include a device Manager Block that establishes communication with an external device, each block having at least one task initiated by at least one instruction,
the at least one task running at a prescribed priority, such that the tasks of different blocks have a hierarchical priority;
determining whether higher priority tasks are present in the blocks of instructions to be executed,
executing the blocks of instructions so that at least one task within each block runs at its respective priority level; and
triggering each higher priority task only upon completion of a corresponding lower priority task,
wherein an entire serial communication cycle is gated by a lower priority task within the Device Manager block such that serial communication is only allowed to run when other, higher priority tasks in a system of the main processor allow the task of the Device Manager block to run.

2. The method according to claim 1 wherein the Device Manager Block of instructions initiates a Device Manager Task that initiates address polling for updating.

3. The method according to claim 1 wherein a set of blocks of instructions includes a Serial Protocol Block that incorporates details of each serial protocol employed to communicate with an external device.

4. The method according to claim 3 wherein the Serial Protocol block initiates a Serial Protocol task that controls writing of data to, and reading of data from an external device.

5. The method according to claim 1 wherein the set of blocks of instructions includes a Serial Port block that encapsulates low-level communication with a serial port.

6. The method according to claim 5 wherein the Serial Port block of instructions initiates a Serial Read Task that reads data from an external device.

7. A method for facilitating asynchronous serial communication by a main processor with at least one external communications device, comprising the steps of:
establishing at the main processor a first block of instructions for execution for serial device handling, a second block of instructions for protocol encapsulation, and a third block of instructions for low-level communication with external devices, each block of instructions including at least one instruction for execution by the main processor and each block having at least one task initiated by at least one instruction, the at least one task running at a prescribed priority, such that the tasks of different blocks have a hierarchical priority;
determining whether higher priority tasks are present in the blocks of instructions to be executed;
executing the first, second and third blocks of instructions so that at least one task within each block runs at its respective priority level; and
triggering each higher priority task only upon completion of a corresponding lower priority task,
wherein an entire serial communication cycle is gated by a lower priority task within the first block such that serial communication is only allowed to run when other, higher priority tasks in a system of the main processor allow the task of the first block to run.

8. The method according to claim 7 wherein the first block of instructions includes a first task that initiates address polling for updating.

9. The method according to claim 7 wherein the second block initiates a second task that controls writing of data to, and reading of data from an external device.

10. The method according to claim 7 wherein the third block of instructions initiates a third task that reads data from an external device.

11. A system which includes a main processor for facilitating asynchronous serial communication with at least one external communications device, comprising:
a first block of data and instructions executed by the processor for serial device handling,
a second block of data and instructions executed by the processor for protocol encapsulation, and
a third block of data and instructions executed by the processor for low-level communication with at least one external device, wherein each block has at least one task that runs at a prescribed priority, such that the tasks of different blocks have a hierarchical priority; wherein it is determined whether higher priority tasks are present in the blocks of instructions to be executed; wherein the processor executes the first, second and third blocks so that at least one task within each block runs at its respective priority level; and wherein each higher priority task is triggered only upon completion of a corresponding lower priority task, wherein an entire serial communication cycle is gated by a lower priority task within the first block such that serial communication is only allowed to run when other, higher priority tasks in a system of the main processor allow the task of the first block to run.

12. The system according to claim 11 wherein the first block includes a first task that initiates address polling for updating.

13. The system according to claim 11 wherein the second block initiates a second task that controls the writing of data to, and the reading of data from an external device.

14. The system according to claim 11 wherein the third block initiates a third task that reads data from an external device.

15. The method according to claim 1, wherein the main processor communicates with the at least one external communications device without a separate co-processor that services the at least one external communication device.

16. The method according to claim 1, wherein said executing and triggering is performed for lower priority tasks only when it is determined that higher priority tasks are present in the blocks of instructions to be executed.

17. The method according to claim 2, wherein the Device Manager Task runs at a lower priority than other system tasks.

18. The method according to claim 4, wherein the Serial Protocol Task runs at a high priority to ensure that the task meets assigned timing deadlines.

19. The method according to claim 4, wherein the Serial Protocol Task includes a semTake function that causes the Serial Protocol Task to stop running until it is triggered.

20. The method according to claim 6, wherein the Serial Read Task runs at a priority high enough to ensure that the Serial Read Task meets timing deadlines as required by any protocol using the serial port.

* * * * *